United States Patent

[11] 3,625,125

[72] Inventor Yozo Iida
 Tokyo, Japan
[21] Appl. No. 847,113
[22] Filed Aug. 4, 1969
[45] Patented Dec. 7, 1971
[73] Assignee Nippon Kogaku K.K.
 Tokyo, Japan
[32] Priority Aug. 8, 1969
[33] Japan
[31] 43/55863

[54] CAMERA HAVING AN AUTOMATIC INDICATOR OF LIGHTING SOURCE
 6 Claims, 5 Drawing Figs.
[52] U.S. Cl. .................................................. 95/11 R,
 95/31 FS, 352/72
[51] Int. Cl. ..................................................G03b 11/00,
 G03b 17/18
[50] Field of Search.......................................... 95/11 V,
 11, 11.5, 31 FS, 10 C; 352/141, 72

[56] References Cited
 UNITED STATES PATENTS
 3,208,363 9/1965 Easterly et al. ................ 95/11.5 X
 3,395,630 8/1968 Haufler et al. ................. 95/11
 3,421,422 1/1969 Winkler......................... 352/72 X
 3,444,798 5/1969 Mayr et al..................... 95/31 FS
 FOREIGN PATENTS
 262,055 5/1968 Austria......................... 95/11

Primary Examiner—Samuel S. Matthews
Assistant Examiner—Robert P. Greiner
Attorneys—Ward, McElhannon, Brooks & Fitzpatrick, Joseph M. Fitzpatrick, John Thomas Cella, Charles B. Cannon, Lawrence F. Scinto, Carroll G. Harper, Charles W. Bradley, Edwin T. Grimes, William J. Brunet and Robert L. Baechtold ABSTRACT: The camera of this invention provides a member for sensing the film type loaded by receiving a signal from the film cartridge, and an operational lever receiving a signal directly or indirectly from an artificial lighting source. With this provision, a spectral sensitivity conversion filter is pivoted in or out of the phototaking light path. According to this invention, with the aid of signals from the sensing member and operational lever, a mark expressing daylight light source, artificial light source or inadequacy for phototaking is selectively indicated to a photographer.

FIG. 1
FIG. 2
FIG. 3
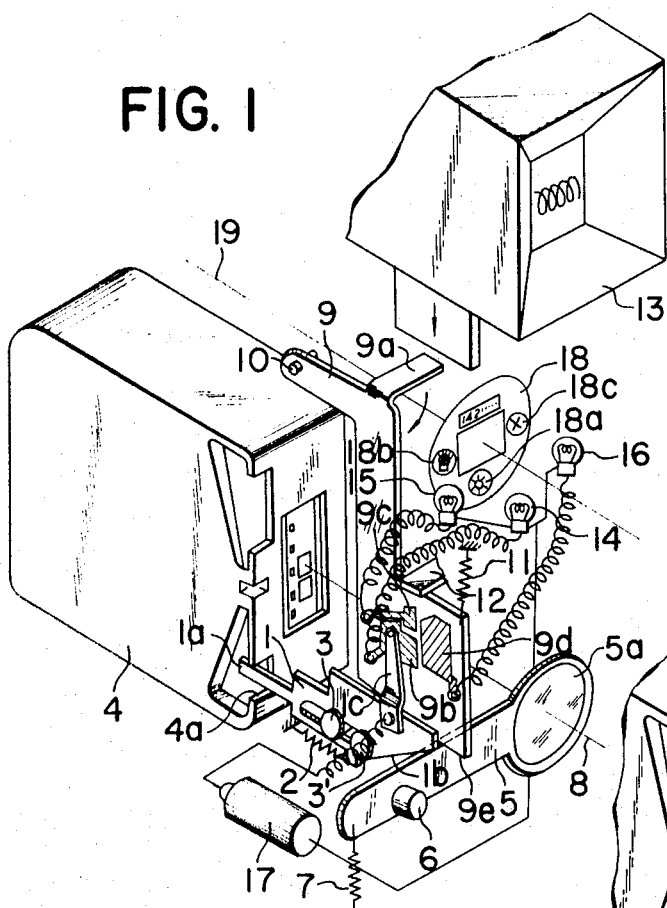
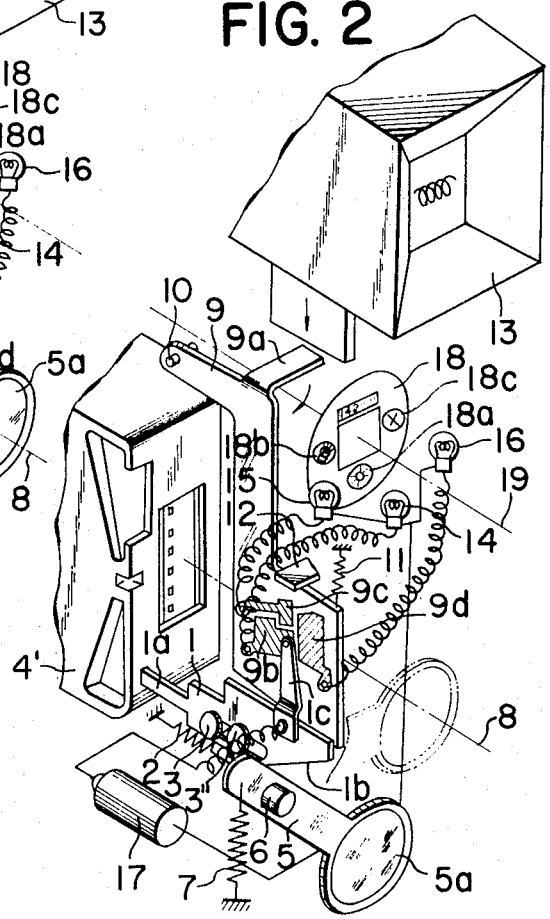
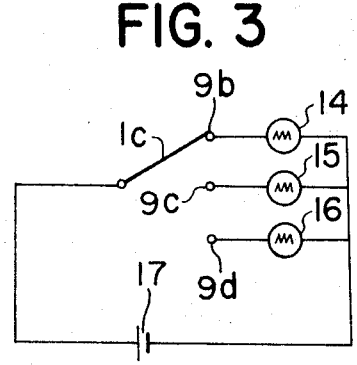

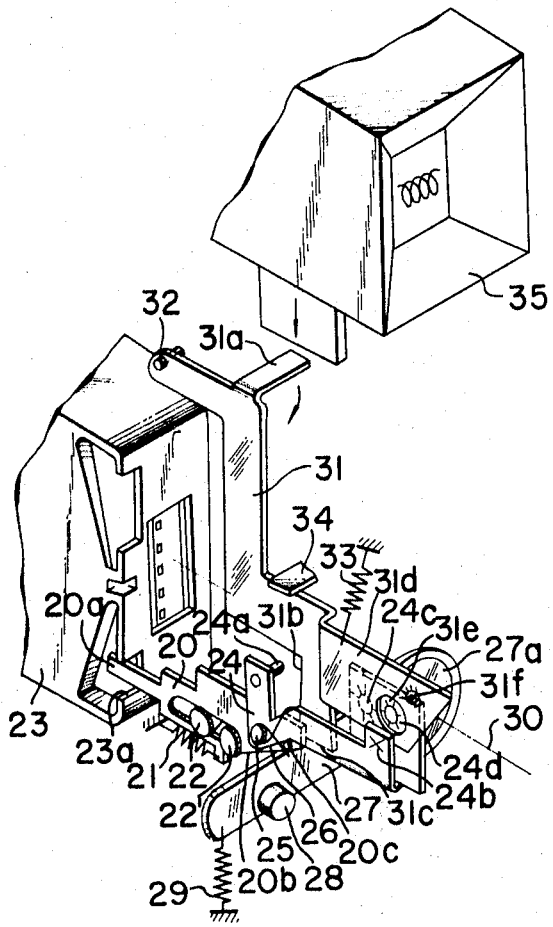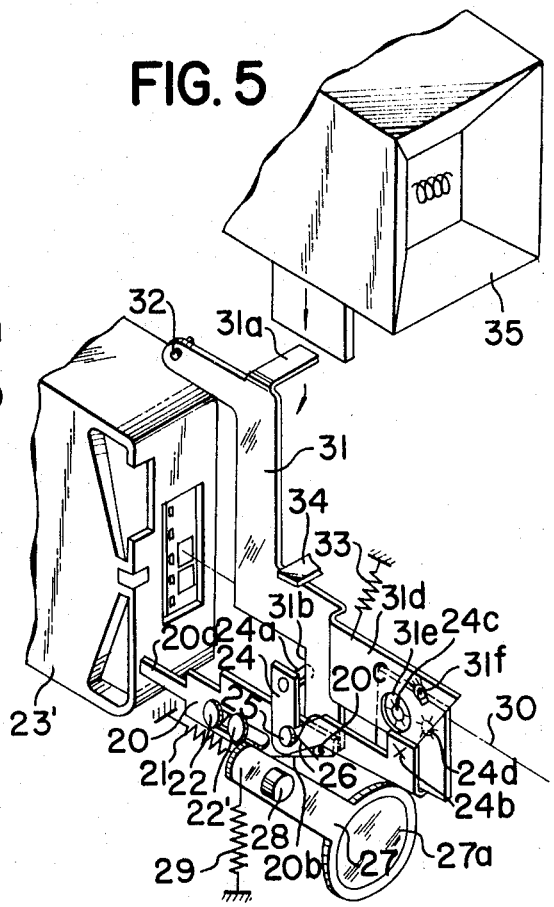

CAMERA HAVING AN AUTOMATIC INDICATOR OF LIGHTING SOURCE

This invention relates to a camera provided with a member for sensing the film-type located by receiving a signal from the cartridge, and an operational lever receiving a signal directly or indirectly from an artificial lighting source so as to pivot a spectral sensitivity conversion filter in or out of the phototaking light path, and more particularly to an automatic indicator of lighting source applicable to said camera.

In a camera so designed as to put a spectral sensitivity conversion filter into or out of the phototaking light path by a signal from the cartridge which contains daylight or artificial light films, or by a signal coming directly or indirectly from an artificial illuminating light source, improper picture-taking is effected when a picture is taken under artificial light with the camera loaded with a daylight-type film cartridge, or when daylight exposure is made with the camera loaded with an artificial light type film cartridge having the spectrum sensitivity conversion filter away from the picture-taking light path.

Therefore the photographer must always remember the kind of the cartridge the camera is loaded with or he must check the kind of cartridge every time he makes a shot to avoid inadequate phototaking.

An object of this invention is to eliminate the above-mentioned defects and to prevent inadequate phototaking in advance by indicating whether or not the light source (daylight or artificial light) is suited for the cartridge loaded in the camera.

According to this invention it is possible to know exactly from outside the camera whether or not the relationship between the film loaded in the camera and the light source, under which the picture is going to be taken, is adequate for picture taking. This is very convenient in practice because the photographer is not required to remember the kind of the cartridge in advance or to check the kind of the cartridge every time he takes a picture.

This invention provides an automatic device for selectively indicating the daylight light source, artificial light source or inadequacy of phototaking, which is to be used for a camera having a member for sensing the film-type loads by receiving a signal from the cartridge, and an operational lever receiving a signal directly or indirectly from an artificial lighting source, by which arrangement, a spectral sensitivity conversion filter is put in or out of the phototaking light path.

This invention will be described more clearly referring to illustrative embodiments shown in the attached drawings, in which:

FIG. 1 is a perspective view of an embodiment of this invention showing the state wherein an artificial light type film cartridge is loaded;

FIG. 2 is a perspective view of the same embodiment, as shown in FIG. 1 but showing the state wherein a daylight type film cartridge is loaded;

FIG. 3 is an electrical circuit of the embodiment shown in FIG. 1;

FIG. 4 is a perspective view of another embodiment of this invention showing the state wherein an artificial light type film cartridge is loaded; and FIG. 5 is a perspective view of the same embodiment as shown in FIG. 4 but showing the state wherein a daylight type film cartridge is loaded.

In FIGS. 1 and 2, a film-type sensing member 1 has a contact finger 1a formed on one end and an inclined surface 1b on the other end. On the upper end portion of the sensing member 1, an insulatingly fixed conductive brush 1c is provided so as to contact its upper end with conductive portions 9b, 9c and 9d of an operating lever 9. The sensing member 1 has an elongated hole in which headed pins 3 and 3' are fitted so as that the sensing member can slide. A spring 2, one end of which is fixed to the camera body and, the other end of which is fixed to the sensing member 1, biases, the sensing member 1 to normally slide it in a direction so that the sensing member 1a will project into a film chamber (not shown). In FIG. 1, an artificial light-type film magazine or cartridge 4 having a notch 4a is loaded in the film chamber, while in FIG. 2, a daylight-type film cartridge 4' having no notch is loaded. When the artificial light-type film cartridge is loaded, the contact finger 1a can freely project into the film chamber i.e., film cartridge through said notch 4a. However, when the daylight-type film cartridge 4' is loaded, the sensing member 1 is pushed to the right direction in FIG. 2 by the front surface of the cartridge 4', since it has no notch. In the latter case, as shown in FIG. 2, the inclined surface 1b of the sensing member 1 pushes the upper edge of a filter frame 5 having a filter 5a at one end so as to rotate the frame 5 downwardly to displace the filter 5a from a phototaking light path 8. The filter 5a is to coincide the spectral sensitivity of the daylight with that of the artificial light, and the filter frame 5 is rotatably supported by a shaft 6 provided on the camera body and is supported by a shaft 6 provided on the camera body and is biased in a counterclockwise direction by a spring fixed to the camera body. The frame 5 is stopped by the lower end 9e of the operating lever 9 so as to be positioned in the light path 8 in case that the artificial light-type film cartridge 4 is used as shown in FIG. 1. The operating lever 9 is pivotably supported by a shaft 10 provided on the camera body and parallely arranged with the sensing member 1. At the upper end of the lever 9, is provided an operating piece 9a for receiving a signal from an artificial light illuminating device 13. The lever 9 is normally biased in the counterclockwise direction by a spring 11, but restricted by a stop member 12.

When the artificial light illuminating device 13 is mounted on the camera body, the operating piece 9a is pushed down as shown by an arrow so as to rotate the lever 9, clockwisely, which in turn rotates the filter frame 5 to displace the filter 5a from the phototaking light path 8.

The conductive brush 1c and conductive portions 9b, 9c and 9d of the lever 9 have the following contacting relationship. As shown in FIGS. 1 and 2, when the film-type sensing member 1 is placed at either the left end position or right end position, the brush 1c and the conductive portion 9b are contacting. When the sensing member is placed at the left end position as shown in FIG. 1, and the operating lever 9 is rotated clockwisely, the brush 1c contacts with the conductive portion 9c. While in case when the sensing member is placed at the right end position and the operating lever 9 is rotated clockwisely, the brush 1c contacts with the conductive portion 9d.

Illumination lamps 14, 15 and 16 illuminate a daylight indicating mark 18a, artificial light indicating mark 18b and a mark showing inadequacy of phototaking 18c of a finder mark 18, respectively, and these lamps are electrically connected to said conductive portions 9b, 9c and 9d of the lever 9, respectively through an electric source 17 as shown in the circuit of FIG. 3. The finder mask 18 providing with said three masks 18a, 18b and 18c is placed end a finder light path 19.

With such a construction as above described, when an artificial light-type film cartridge 4 is loaded as shown in FIG. 1, the film-type sensing member 1 does not operate because of the presence of a notch 4a and the filter 5a is also positioned in the predetermined picture-taking light path 8 due to the force of the spring 7, and the camera is in daylight-picture-possible state. Simultaneously, the conductive brush 1c of the sensing member 1 contacts the conductive portion 9b of the operating lever 9, the electric circuit shown in FIG. 3 is closed, and the lamp 14 is lit to light up the daylight indicating mark 18a of the finder mask 18. Consequently, the photographer can confirm that daylight picture- taking is possible.

When the artificial light illuminating device 13 is attached to the camera body in order to take a picture under artificial lighting, the operating lever 9 rotates in the clockwise direction against the force of the spring 12, and the surface 9e of the operating lever 9 presses the filter frame 5. As a result, the filter frame 5 rotates clockwise against the force of spring 7 and the filter 5a is pivoted away from the picture-taking light path to bring about an artifical-light-picture-taking state. At the same instance, the conductive brush 1c of the sensing member 1 contacts the conductive portion 9c of the operating lever 9. Therefore, the lamp 15 goes on and lights up the artificial light indicating mark 18b on the finder mask 18, and the photographer can confirm that an artifical-light-picture-taking is possible.

When, a daylight-type film cartridge 4' is loaded as shown in FIG. 2, the film-type sensing member 1 slides rightward by the pressure of the film cartridge 4' and, at the same time, rotates the filter frame 5 clockwise by the action of the inclined surface 1b to displace the filter 5a from the picture-taking light path 8 and to bring the camera into the daylight-picture-taking state. These electroconductive brush 1c slides along the conductive portion 9b and stops in the conductive section 9b. Therefore, the lighting lamp 14 goes on and lights up the daylight indicating mark 18a, and the photographer can confirm that daylight picture taking is possible. When, by accident, the photographer attaches the artificial illuminating device 13, (the said daylight-type film cartridge 4' is not adapted to artificial lighting and is not suited for artificial light picture taking), the operating lever 9 rotates clockwise against the force of the spring 12 and the contact between the conductive brush 1c and the conductive brush portion 9b is switched to the contact between the conductive brush 1c and the conductive portion 9d, and the lamp 16 goes on to light up the no-picture-taking indicating mark 18c. Therefore, the photographer can confirm that picture-taking is inadequate.

It is, of course, possible to use an alarm such as a buzzer etc. instead of the lamp 16 and the no-picture-taking indicating mark 18c.

FIGS. 4 and 5 shows an another embodiment, in which a film-type sensing member 20 has as its one end a contact finger 20a and at the other end an inclined surface 20b and a restricting pin 20c. The sensing member 20 has an elongated hole in which two headed pins 22 and 22' are fitted so that the sensing member can be slidable along pins 22 and 22'. The sensing member 20 is normally biased to the left by a spring 21 as a result that the contact finger 20a can be projected into a film chamber not shown In FIG. 4, an artificial light-type film cartridge 23 having no notch is loaded in artificial light-type film cartridge 23 having a notch 23a is loaded in the film chamber. On the other hand, in FIG. 5, a daylight-type film cartridge 23' having no notch is loaded in the film chamber. When the artificial light-type film cartridge 23 is loaded, the contact finger 20a can freely project into the film chamber, i.e. film cartridge through the notch 23a. However, when the daylight type-film cartridge 23' is loaded, the sensing member 20 is pushed to the right by the front surface of the cartridge 23' since it has no notch. In the latter case, the inclined surface 20b of the sensing member 20 pushes a filter frame 27 to displace, a filter 27a provided at one end of the frame 27 from the photo-taking light path 30. An indicating member 24 has at its one end an operating pin 24a contactable with a surface 31b of an operating lever 31 and the other end of the member 24 is formed in a channel shape. On one of side pieces constituting the channel there is provided a mark 24b indicating an inadequacy of phototaking. On the side piece of the channel, marks for indicating the daylight 24c and 24d are provided in parallel to the sliding direction of the sensing member 20 with a space identical with the shift amount of said movable sensing member 20. The indicating member 24 is pivotably mounted on a shaft 25 planted on the sensing member 20 and is normally in contact with the restricting pin 290 c. The filter 27a on the filter frame 27 coincides the spectral sensitivity of the daylight film to that of the artificial light film and is pivotably mounted on a shaft 28 provided on the camera body. The frame 27 is biased in a counterclockwise direction by a spring 29 and is stopped by an operating lever 31 so that the filter 27a is positioned within the phototaking light path 30. The operating lever 31 is parallelly arranged with said sensing member 20 and pivotably mounted on a shaft 32 fixed to the camera body. The lever 31 has at its upper portion an operating piece 31a for receiving a signal from an artificial light illuminating device 35 and at its lower end, a surface 31b formed to contact with the operating pin 24a and a surface 31c formed to contact with the filter frame 27. On the end portion 31d of the lever 31, a circular hole 31e is formed and a mark indicating the artificial light 31f is provided at a position on the circumference having a radius equivalent to a distance between the hole 31e and the rotating center of the operating lever 31 and deviated from the hole 31e by a displacement angle of the operating lever 31. The displacement angle is a rotating angle of the lever 31 moved by mounting the artificial light illuminating device 35. The lever 31 is biased in a counterclockwise direction by a spring 33 and stopped by a restricting member 34. The end portion 31d is inserted between the two pieces of the channel shape portion of the member 24 and said hole 31e is made to register with a window (not shown) of the camera. The marks 24c and 24d of the member 24 register with the hole 31e in FIGS. 4 and 5 and the mark 24b registers with the window of the camera as the operating lever 31 rotates in FIG. 5.

With such a construction as described so far, in accordance with the second embodiment, when the artificial light-type film cartridge 23 is loaded as shown in FIG. 4, the film-type sensing member 20 does not operate because of the notch 23a, and the filter 27a is positioned in the predetermined picture-taking light path 30 by the force of the spring 29. The camera is brought into a daylight-picture-taking state, and the daylight indicating mark 24d is displayed in the window of the camera not indicated in the drawing. Therefore, the photographer can confirm that he is allowed to take a daylight picture. When, for purpose of making an artificial light photograph, the artificial light illuminating apparatus 35 is attached to the camera not indicated in the drawing, the operating lever 31 rotates clockwise against the force of the spring 33 and the contact surface 31c of the operating lever 31 displaces the filter frame 27. As a result, the filter frame 27 rotates clockwise against the force of the spring 29, the filter 27a is displaced from the picture-taking light path 30, and the camera is brought into an artifical-light-picture-taking-state. At the same time, the artificial light indicating mark 31F moves to the position corresponding to the window of the above-mentioned camera. Therefore, the photographer can confirm he is allowed to take an artificial light picture. When a daylight type film cartridge 23' is loaded as shown in FIG. 5, the film-type sensing member 20 is pushed by the daylight type film cartridge and is moved rightward. At the same time, the filter frame 27 is rotated clockwise by the action of the inclined surface 20b to rotate the filter 27a from the picture-taking light path 30 and to bring the above-mentioned camera into a daylight-picture-taking state. Simultaneously, the daylight indicating mark 24c is moved to the position of the circular hole 31e and is displayed on the window of the camera. Therefore, the photographer can confirm that he is allowed to take a daylight picture. When, however, the photographer has attached the artificial lighting apparatus by accident (artificial-light-picture taking is improper because the said daylight-type film cartridge 23' is not adapted to artificial lighting), the operating lever 31 rotates clockwise against the force of the spring 33, the indicating part 24 rotates counterclockwise against the force of the spring 26 because the operating pin 24a makes contact with the contact surface 31b of the operating lever 31, and the no-picture-taking indicating mark 24b moves to the position of the window of the camera. Therefore, the photographer can known from outside of the camera that the film is inadequate for picture-taking. Although the indicating marks are displayed on the window of the camera not indicated in the drawing it is of course possible to display the said indicating marks in the finder.

What is claimed is:

1. In a camera having means for interconnecting an artificial light unit and being loaded by insertion of a film magazine which is provided with structural means representative of the spectral sensitivity of the film therein; the improvement which comprises:

filter means for correcting the spectral composition of film-exposing light passing along the picture-taking axis of the camera;

a pivotable frame member supporting said filter means and arranged to removably position said filter means across the light axis of said camera;

a first control member engaging said frame member and being movable from a first position wherein said filter is in its filtering position to a second position to pivot said frame member to displace said filter from said filtering position, said first control member being responsive to said structural means of said film magazine for movement from said first position to said second position;

a second control member engaging said frame member and being movable from a first position wherein said filter is in its filtering position to a second position to pivot said frame member to displace said filter from said filtering position, said second control member being moved from said first position to said second position in response to the attachment of said artificial light unit to said camera;

means for indicating respectively, daylight, artificial light and nonproper lighting conditions;

said indicating means being selectively operable in accordance with relative movement of said first and second control members whereby nonproper lighting is indicated by said indicator means when said first and second control members are simultaneously in said second position.

2. A camera according to claim 1 wherein said indicating means includes a warning signal lamp representing the nonproper lighting condition, and electrical switching means for lighting the warning signal lamp in cooperation with said first and second control members.

3. A camera according to claim 2, wherein said switching means comprises a conductor for said warning signal lamp provided on said second control member movable together therewith and electrically connected to said signal lamp; and a contact fixed on said first control member and engageable with said conductor.

4. A camera according to claim 3, wherein said indicating means further includes a second signal lamp representing the artificial lighting condition;

a third signal lamp representing the sun light condition; and said switching means further includes a second conductor provided on said second control member movable together therewith and electrically connected to said second signal lamp;

a third conductor provided on said second control member movable together therewith and electrically connected to said third signal lamp, said conductor for the warning signal lamp and the second and third conductors are being selectively engaged by said contact in response to the movement of said both controls members.

5. A camera according to claim 4, wherein said indicating means includes a mask having three marks provided within the camera view finder and representing lighting conditions, whereby said three marks are selectively illuminated by three signal lamps respectively.

6. A camera according to claim 1 which further comprises a rockable lever pivoted on the first control member and having a plate at one end thereof being spaced laterally therefrom, said rockable lever being engaged by said second control member and being pivoted thereby when said both control members move said filter means out of alignment with the picture-taking axis;

a projection surface extending from said second control member into said space between said plate and said lever and said indicating means includes an artificial light mark provided on the projection surface of the second control member for representing the artificial light condition;

a warning mark provided at the end portion of the rockable lever for representing nonproper lighting; and two sun light marks provided on said plate for representing sun light, whereby said marks being respectively arranged whereby said artificial light mark covers one of said sun light marks when said second control member is located at the second position and said warning mark covers said artificial light mark when said rockable lever is engaged by said second control member.

* * * * *